UNITED STATES PATENT OFFICE.

HENRY A. KOHMAN, OF PITTSBURGH, PENNSYLVANIA, CHARLES HOFFMAN, OF NEW ROCHELLE, NEW YORK, AND ALFRED EDWARD BLAKE, OF PITTSBURGH, PENNSYLVANIA, ASSIGNORS, BY MESNE ASSIGNMENTS, TO WARD BAKING COMPANY, OF NEW YORK, N. Y., A CORPORATION OF NEW YORK.

BREAD-MAKING COMPOSITION.

1,282,867.

Specification of Letters Patent. Patented Oct. 29, 1918.

No Drawing. Application filed December 10, 1914. Serial No. 876,502.

*To all whom it may concern:*

Be it known that we, HENRY A. KOHMAN, CHARLES HOFFMAN, and ALFRED EDWARD BLAKE, all citizens of the United States, residing, respectively, at Pittsburgh, Allegheny county, State of Pennsylvania, New Rochelle, Westchester county, State of New York, and Pittsburgh, Allegheny county, State of Pennsylvania, have invented certain new and useful Improvements in Bread-Making Compositions, and we do hereby declare the following to be a full, clear, and exact description of the invention, such as will enable others skilled in the art to which it appertains to make and use the same.

In an application for Letters Patent of the United States, filed by us, under date of March 26, 1913, Serial No. 756,940, we have described certain improvements in the making of leavened bread based upon the discovery that whether the bread is made in accordance with the sponge process or in accordance with the straight dough process, the quantity of yeast that would otherwise be necessary for completing the fermentation within a given period of time may be very materially diminished by supplying to the batch certain salts which have a stimulating effect upon the activity and propagation of the yeast cells, in the presence of the starchy dough mixture; and that, also, employing the same quantity of yeast as that ordinarily used, the employment of the salts permits the fermentation of the batch of dough to proceed more rapidly, while still preserving satisfactory commercial conditions so that, when desired, the bread-making process may be finished in a correspondingly lesser period of time. The salts that have been found serviceable for the purposes referred to are appropriate innocuous salts of ammonium and appropriate innocuous salts of calcium, particularly when used conjointly.

The present application constitutes a division of the application hereinbefore referred to, and relates to the novel composition of matter involved in the incorporation of the ammonium salts together with the calcium salts, in the filler (such as flour, or other appropriate starchy material), in which they are adapted to be marketed.

As more fully explained in the application Serial No. 756,940, referred to, relatively small amounts of the salts are required for the production of the desired effects. Thus, one ounce of ammonium chlorid and two ounces of calcium sulfate to each 100 pounds of flour contained in the bread-making batch suffice to permit the completion of the required fermentation of the batch within a given interval of time, with the employment of about one-half of the quantity of yeast usually required; or, with the employment of a given quantity of yeast, to materially cut down the time required for the fermentation. It is not found of advantage to increase these proportions but they may be considerably diminished, and yet give important and valuable results. Thus, for instance, the amount of ammonium chlorid used may be say one-half ounce to each 100 pounds of flour, and it will be found that a resultant saving in yeast for any given period of fermentation, will be likewise realized. In fact, in such case, the saving in yeast will be considerably greater than one-half the saving that would be incident to the employment of one ounce, under the same conditions. It will be understood, therefore, that in recommending the employment of one ounce of the ammonium chlorid to every 100 pounds of flour, it is not intended to restrict the invention to that proportion. So also, it is feasible, with useful results, to use a lesser quantity than two ounces of the calcium sulfate, and, while recommending that amount as preferable, it is not intended to restrict the invention to that proportion.

Ammonium chlorid and calcium sulfate are neutral salts. They are cheap and are non-hygroscopic and, with a suitable filler such as, for instance, flour or some other suitable starchy material, they are well adapted to be made up into a suitable mixture that can be used with convenience and accuracy as a composition of matter for sale to the trade. It will be understood, however, that we do not restrict the invention to the employment of ammonium chlorid or of calcium sulfate in the mixture, nor to the employment of neutral ammonium or calcium salts therein. Thus, in some instances, it may be feasible and desirable to use the acid salts or even those salts which give an alkaline reaction. For instance, calcium di-acid phosphate $Ca(HO_2PO_4)_2$ is available for the purpose, in lieu of calcium sulfate, and ammonium acid tartrate $K(NH_4)C_4H_4O_6$ is available in lieu of ammonium chlorid, although, in both instances, the acid salts referred to are of higher cost.

In putting the salts upon the market in the form of a composition of matter, in connection with a filler of flour or other appropriate starchy material, the filler should be of such relatively large amount (say ten times the amount by weight of the salt), that any slight inaccuracies of the user in adding the mixture to the batch will be correspondingly unimportant for the realization of the intended results. It is further apparent that, if desired, the necessary proportion of salts may be incorporated in the flour at the time it is barreled at the mill, and may be sold to the trade in that form.

What we claim is:

1. As a new composition of matter for use, associated with yeast, in the making of leavened bread, flour or other starchy material containing in admixture therewith an innocuous ammonium salt and free from interfering constituents; substantially as described.

2. As a new composition of matter for use, associated with yeast, in the making of leavened bread, flour or other starchy material containing in admixture therewith an innocuous ammonium salt and an innocuous calcium salt; substantially as described.

3. As a new composition of matter for use, associated with yeast, in the making of leavened bread, flour or other starchy material containing in admixture therewith ammonium chlorid and free from interfering constituents; substantially as described.

4. As a new composition of matter for use, associated with yeast, in the making of leavened bread, flour or other starchy material containing in admixture therewith ammonium chlorid and an innocuous calcium salt; substantially as described.

5. As a new composition of matter, for use, associated with yeast, in the making of leavened bread, flour or other starchy material containing in admixture therewith an innocuous ammonium salt and calcium sulfate; substantially as described.

6. As a new composition of matter for use, associated with yeast, in the making of leavened bread, flour or other starchy material, containing in admixture therewith ammonium chlorid and calcium sulfate; substantially as described.

In testimony whereof we affix our signatures in the presence of witnesses.

HENRY A. KOHMAN.
CHARLES HOFFMAN.
ALFRED EDWARD BLAKE.

Witnesses to the signatures of Henry A. Kohman and Alfred Edward Blake:
S. C. PERRING,
Jos. F. SMITH.

Witnesses to the signature of Charles Hoffman:
M. A. BILL,
L. BATES.